UNITED STATES PATENT OFFICE.

I. P. WILLIAMS, OF SALEM, MASSACHUSETTS, ASSIGNOR TO HENRY L. WILLIAMS, OF SAME PLACE.

IMPROVEMENT IN PRE-TANNING COMPOSITIONS.

Specification forming part of Letters Patent No. 15,157, dated June 17, 1856.

*To all whom it may concern:*

Be it known that I, ISRAEL P. WILLIAMS, of Salem, in the county of Essex and State of Massachusetts, have invented a new and useful Improvement in Tanning Hides or Skins; and I do hereby declare that the same is fully described in the following specification.

After the hides have been subjected to the "liming" and "drenching" processes, and previously to immersing them in the tanning-liquor, I treat them by certain chemical agents, to be hereinafter explained, in order to prepare them for the reception of tannin and to maintain their pores open, so that the tannin can thoroughly penetrate them. It is well known that if the hides, after being limed and bated, are immediately subjected to the action of the tanning-liquor their pores are liable to become so contracted and filled near the surfaces of the hides as to more or less obstruct the penetration of the tanning agent into them, the hides thereby being imperfectly tanned, and containing what tanners term "horn," which is the hide in an untanned or horny state. By my process I find that the hide is plumped and its pores enlarged, so that the tannin has a chance to thoroughly and perfectly penetrate it. It is well known that the bate or drench acts by the muriate of ammonia which it contains. This salt is decomposed by the lime, which drives off its base, (the ammonia,) and, taking up the muriatic acid, then becomes soluble muriate of lime, and passes off with the rinse-water. Immersion of the hide in the bate removes the lime and reduces the hide to its original thickness.

The object of my invention is to plump or swell the hide after the action of the bate, and so that the tannin can penetrate it, and at the same time I wish to prevent putrefaction, which it is well known is likely to result or be promoted by the use of the carbonate of soda. Therefore I use niter in connection with the carbonate. I also employ an acidulated bath in manner and for the purpose as hereinafter described.

In carrying out my invention I first immerse the hides in a bath composed of carbonate of soda, niter, and water, using to every sixteen gallons of the liquid about eight pounds of the carbonate of soda and two pounds of niter. In this bath I permit the hides to steep some three or four days, and after removing them therefrom I immerse them in a bath of acidulated water—that is, water acidulated by vinegar or some other acid by which the carbonate of soda in or near the surface of the hides may be neutralized. The bath of acidulated water is employed to neutralize the alkali or soda at or near the surfaces of the hide in order that the alkali may not act on the tanning-liquor when the latter is fresh, and so as to impart to the hide too dark a color. As the tanning-liquor becomes acid by standing and exposure to the atmosphere, the acid of it will further serve to neutralize the alkali. When the tanning-liquor is first made and used it is not acid. Therefore I use an acid solution to act on the hide before it is immersed in the tan-liquor, as were I not to do so the alkali and tan-liquor would produce the ill effect above stated.

I am aware that a patent for preparing hides for the reception of tan-liquor was granted on July 12, 1853, to John J. Fulton for the use of muriate of ammonia in combination with niter or nitrate of potash for the ostensible purpose of suspending putrefaction and adding strength to the animal tissues. Nitrate of potash in solution with muriate of ammonia produces chloride of potassium and nitrate of ammonia. The compound cannot be considered as an equivalent to a solution of niter and carbonate of soda as used by me, because the muriate of ammonia does not act as an alkali, as does the carbonate of soda, and exercises no effect in plumping the hide, whereas the carbonate of soda plumps the hide, but while so operating it promotes putrefaction; and in order to counteract such I add nitrate of potash to protect the vessels of the hide. The subsequent use of acid is to remove the alkaline action on the immersion of the hide in the tan-liquor. It further acts on the niter to oxidize the hide, whereby the absorption of the tannin is promoted. Fulton does not employ the acidulated bath in his process, and consequently such process is not like mine, as such a bath is an essential feature in the latter. Muriate of ammonia is an entirely different salt from carbonate of soda. Not only does it differ in its constituents, but in its action on the hide.

I do not claim the employment of either carbonate of soda or niter in the tanning-liquor; nor do I claim the employment of a hydrated solution of nitrate of potash and muriate of ammonia in the treatment of hides preparatory to their being immersed in the tan-vat; but What I do claim is—

Subjecting the hides, after the liming and drenching of them, and preparatory to their being immersed in the tanning-liquor, to the action of a bath of the carbonate of soda and niter and one of an acid solution or mixture, as specified, the same being for the purpose as set forth.

In testimony whereof I have hereunto set my signature this 30th day of October, 1855.

ISRAEL P. WILLIAMS.

Witnesses:
R. H. EDDY,
F. P. HALE, Jr.